United States Patent [19]

Thomas

[11] 4,285,299
[45] Aug. 25, 1981

[54] METHOD AND APPARATUS FOR COLLECTING POULTRY

[76] Inventor: Doverd E. Thomas, 2319 Fairway Cir., SE., Decatur, Ala. 35601

[21] Appl. No.: 53,357

[22] Filed: Jun. 29, 1979

[51] Int. Cl.³ .............................................. A01K 31/00
[52] U.S. Cl. ......................................... 119/17; 119/19
[58] Field of Search ....................... 119/15, 17, 19, 21, 119/82; 217/42, 57; 220/335

[56] References Cited

U.S. PATENT DOCUMENTS

| 284,008 | 8/1883 | Hass | 220/335 X |
| 2,552,007 | 5/1951 | Griffith | 119/19 X |
| 3,244,359 | 4/1966 | Holland | 119/17 X |
| 3,621,818 | 11/1971 | Johnston et al. | 119/17 X |

FOREIGN PATENT DOCUMENTS

| 2723686 | 11/1978 | Fed. Rep. of Germany | 119/82 |
| 1280828 | 7/1972 | United Kingdom | 119/17 |

*Primary Examiner*—Gene Mancene
*Assistant Examiner*—Robert P. Swiatek

[57] ABSTRACT

Method and apparatus for collecting poultry wherein an enclosure door aligned with the floor of the enclosure is inclined at an angle of at least about 12° from horizontal and poultry is placed on the door and released to slide down the door and into the enclosure. Preferably, both the door and the floor are inclined to an angle of at least about 12°, with both lying in substantially the same plane. The construction of the door, and preferably the floor also, is such that a bird placed on the door will slide down the door when the door is inclined at an angle of at least about 12° to horizontal. In the apparatus, banks of such enclosures are secured together in a back-to-back relationship to form a unitary structure which can be handled as one piece. The structure is inclined in one direction to fill the enclosures on one side and is then inclined in the other direction to fill the enclosures on the other side.

4 Claims, 3 Drawing Figures

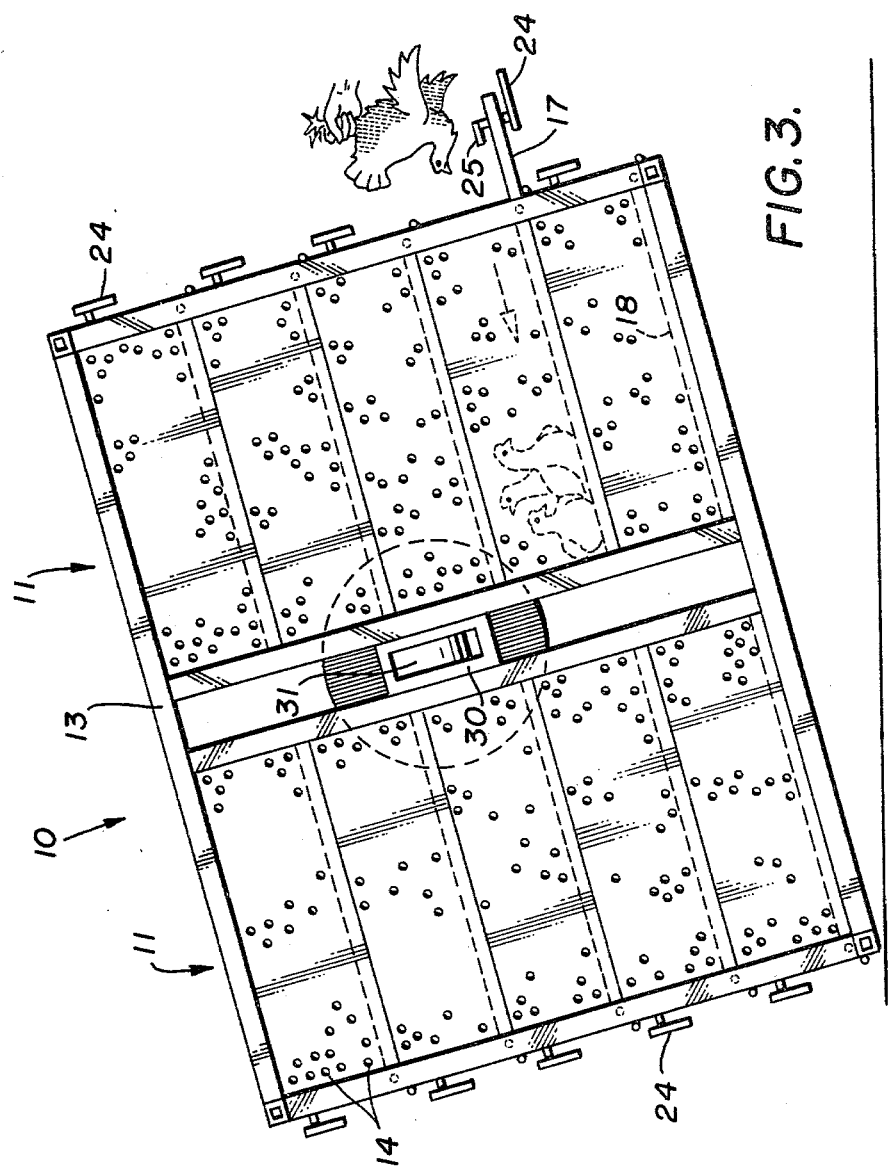

METHOD AND APPARATUS FOR COLLECTING POULTRY

BACKGROUND OF THE INVENTION a. Field of the Invention

This invention relates to methods and apparatus for collecting poultry.

b. Description of the Prior Art

The method now used for collecting poultry, especially chickens, at the broiler house is a method which has been used for years. Usually, a flatbed truck transports a large number of individual cages to the broiler house, each cage having a small door in the top. The cages are stacked in a row in the broiler house. Acting in semi-darkness or under special lights, workmen grasp the chickens by the legs and stuff them through the small doors in those cages on the top of the stack. When a cage is full, it is manually lifted and moved to form a stack of filled cages. A forklift may be used to load the stack of filled cages onto the truck for transportation to the processing plant.

The construction of the cages and the necessary manual handling of the cages makes the collecting operation slow. The longer a worker is in the broiler house, the longer he is exposed to the powdery dust of chicken manure which fills the air in such an operation. That this exposure is a health hazard is well known. Also, manually lifting and moving filled cages is not easy work. As a result, it is very difficult to hire and keep employees who will do this type of work.

The insertion of the poultry through the small door of the conventional cages under poor lighting conditions increases the likelihood of bruising the poultry. Bruised poultry must be downgraded, resulting in lower profits. Larger door openings could be used but the larger doors would hamper movement of workers bringing poultry to the cages and the other problems involved would not be solved.

Various types of enclosures have been proposed for use in collecting poultry but none have really solved the basic problems inherent in this operation and none of them are being used commercially to any significant extent.

The present invention reduces the time that the worker is exposed to chicken manure, reduces the probability of bruising and completely eliminates the heavy manual labor involved in lifting and moving filled cages.

SUMMARY OF THE INVENTION

Method and apparatus for collecting poultry wherein an enclosure door in alignment with the floor of the enclosure is inclined at an angle greater than about 12° from horizontal and poultry is placed on the door and released to slide down the door and into the enclosure. The construction of the door, and preferably the floor also, is such that a bird placed on the door will slide along the door when the door is inclined at an angle of at least about 12° from horizontal. In the apparatus, banks of enclosures are secured together in a back-to-back relationship to form a unitary structure which can be handled as one piece. This structure is inclined in one direction to fill the enclosures on one side and is then inclined in the other direction to fill the enclosures on the other side.

DESCRIPTION OF THE DRAWINGS

FIG. 3 is an end view of the apparatus of this invention showing the positioning of the apparatus for loading or collecting poultry.

DETAILED DESCRIPTION OF THE INVENTION

Figure 1:
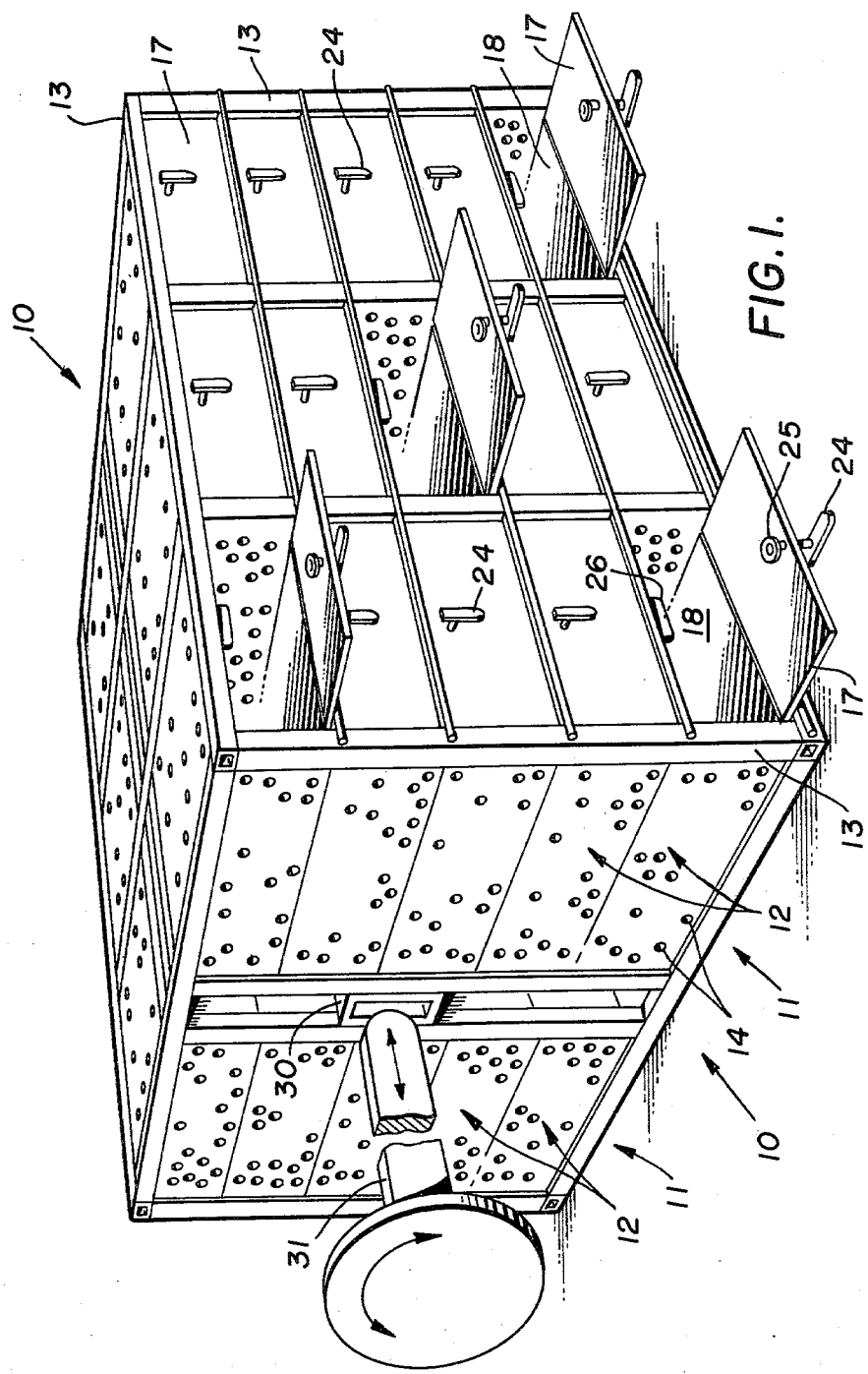
FIG. 1 is a perspective view showing the construction of the apparatus of this invention.

Referring now in detail to the drawings, there is shown a unit 10 made up of two banks 11 of enclosures 12 secured together in a back-to-back relationship in a frame 13. Each of the banks 11 is made up of a plurality of side-by-side enclosures 12 which have open sides facing outward. Each enclosure 12 is provided with a door 17 which is pivotally mounted so that the door can be moved from an open position to a closed position in the open side of the enclosure. The walls of the enclosures are provided with perforations 14, for ventilation purposes.

The door 17 of each enclosure, in operative position, is in alignment with floor 18 of the enclosure, with the pivotal axis of the door being adjacent to the edge of the floor. By "in alignment" we mean that the doors 17 are so positioned that a bird will slide off the door and be deposited on the floor of the associated enclosure when the door is inclined to a certain angle, as described herein.

Figure 2:
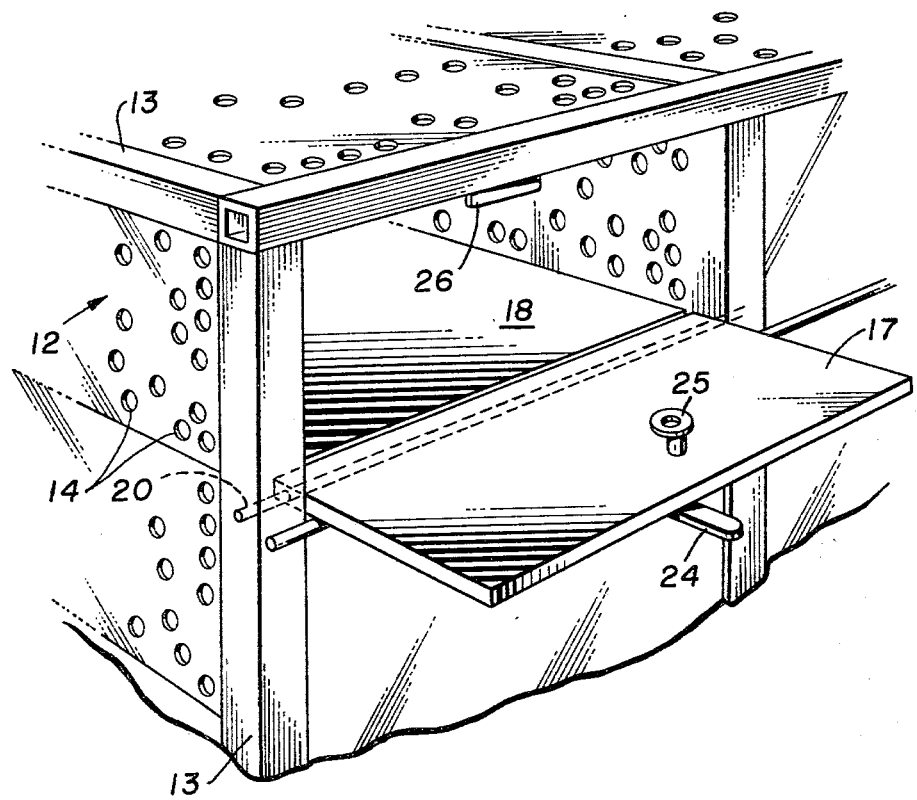
FIG. 2 is an enlarged fragmentary perspective view showing the construction of the door of the enclosure which contains the poultry.

More specifically, each door is pivotally mounted on a rod 20 (FIG. 2) secured to the frame 13 adjacent and parallel to one edge of the floor 18. Stop rods 21 secured to the frame 13 serve to limit movement of the doors in such a manner that, when the door is fully open, it lies substantially in the plane of the floor 18.

Each door 17 is provided with a handle 24 for operating a latch 25 which cooperates with a plate 26 to secure the door 17 in a closed position.

The construction of the doors 17, and preferably the floors 18 also, is such that a bird placed on the door will slide along the door when the door is inclined to an angle of at least about 12° to 20° to horizontal. This angle, which is preferably about 12°–15° may vary up to about 20°, depending on the material from which the door is made and the door construction.

The smaller angles may in some cases be slightly less than the angle of repose. However, the birds will be moving when the worker releases them, so that the frictional coefficient involved will be the sliding coefficient rather than the static coefficient. The sliding coefficient of friction is less than the static, so that the birds will slide at an angle slightly less than the angle of repose.

It is preferred that the doors 17 and floors 18 be made from a sheet of unperforated metal or plastic, so that there will be nothing that the feet or toes of the bird can snag or be caught on. For ventilation purposes, it may be desirable to provide the door 17 and floor 18 with small perforations or slits. If so, these perforations or slits should be such that the bird will slide freely and the foot or toes of the bird will not be caught as the bird slides along the door. If the perforations in the door are too large or too numerous, the bird will not slide down the door as desired.

A channel member 30 is secured to the frame 13 between the banks 11 as best shown in FIG. 3. The channel 30 is adapted to receive an elongated bar 31 attached to a fork lift (not shown) which is capable of both raising and lowering the bar 31 and pivoting the bar 31 about its axis to pivot the channel and incline the unit 10. Such fork lifts are well known.

In carrying out the process of the invention the unit 10 is raised off the ground by the fork lift (not shown) and is then tilted or inclined at an angle of at least about 12° to horizontal. The birds are manually placed on the open door 17, as shown in FIG. 3, and released to slide down the door and into the enclosure 12 associated with that door 17, the door being positioned at an angle of at least about 12° to horizontal.

It is preferred but not necessary that the door 17 and the floor 18 be inclined to the same angle. It is possible to position the floor horizontally or at some angle less than about 12° and position the door 17 at an angle equal to or greater than about 12°. In this case, the birds will slide down the inclined door and stop at some point in the enclosure, depending on the angle of inclination of the floor 18.

However, it is preferred that both the floor 18 and the door 17 be inclined at an angle of at least about 12° and that the door and the floor lie substantially in a common plane, as shown in FIG. 3. In this case, the workman places the birds on the door 17 and releases them to slide down the door and into the enclosure 12.

It is possible to incline the door at an angle greater than 20° to horizontal. However, increasing this angle increases the speed at which the bird enters the enclosure and the force with which the bird strikes other birds or the far wall of the enclosure. If this angle is sufficiently high, the bird will enter the enclosure with essentially the same force as a dropped bird. In order to insure gentle treatment of the birds and lower the possibility of bruising, it is preferred that the door be positioned at an angle no greater than about 45° from horizontal.

FIG. 3 shows the right bank of enclosures 12 being filled. When that bank of enclosures is full the doors are closed and the unit 10 is tilted to incline the left bank as described above for loading.

What is claimed is:

1. Apparatus for collecting poultry comprising,
  a. a pair of banks of enclosures secured together in a back-to-back relationship, each of said banks being made up of a plurality of enclosures secured together in a side-by-side relationship, said enclosures each having a floor and perforated walls,
  b. each of said enclosures having a door pivotally attached to each bank in alignment with the floor of said enclosure, said door being such that a bird placed on the door will slide along the door when said door is inclined to an angle of about 12° to 20° from horizontal, and
  c. a channel member mounted between and secured to said banks for supporting and inclining said banks when said channel member is pivoted.

2. The apparatus of claim 1 wherein stops secured to the banks hold the doors and floors of each bank in substantially the same plane when said doors are fully open.

3. Apparatus for the collection of poultry, comprising:
  a. a pair of enclosures each having walls and a floor, said walls having therein perforations for ventilation,
  b. each of said enclosures having a door pivotally connected to the enclosure in alignment with the floor of said enclosure, said doors being such that a bird placed on the door will slide along the door when said door is inclined at an angle of about 12°–20° from horizontal, said enclosures being secured together in a side-by-side relationship to form a bank of enclosures, said bank having attached thereto a member adapted to support and incline said bank when said member is pivoted.

4. A method for collecting poultry, comprising
  (a) providing a pair of enclosures in a back-to-back relationship, each of said enclosures having a floor and a door pivotally connected to the enclosure along a line generally parallel to said floor, said door and floor being in substantially the same plane when the door is fully open,
  (b) inclining the enclosures in one direction to position the door and floor of one of said enclosures at an angle of at least about 12° from horizontal,
  (c) placing said poultry on said door, and
  (d) releasing the poultry to allow said poultry to slide down the door onto the floor of said one enclosure, said enclosures being first inclined in said one direction to fill said one enclosure and then being inclined in the other direction to fill the other enclosure.

* * * * *